May 1, 1934.                R. SCHOFIELD                1,957,361
DUST AND MUD GUARD
Filed Oct. 28, 1932
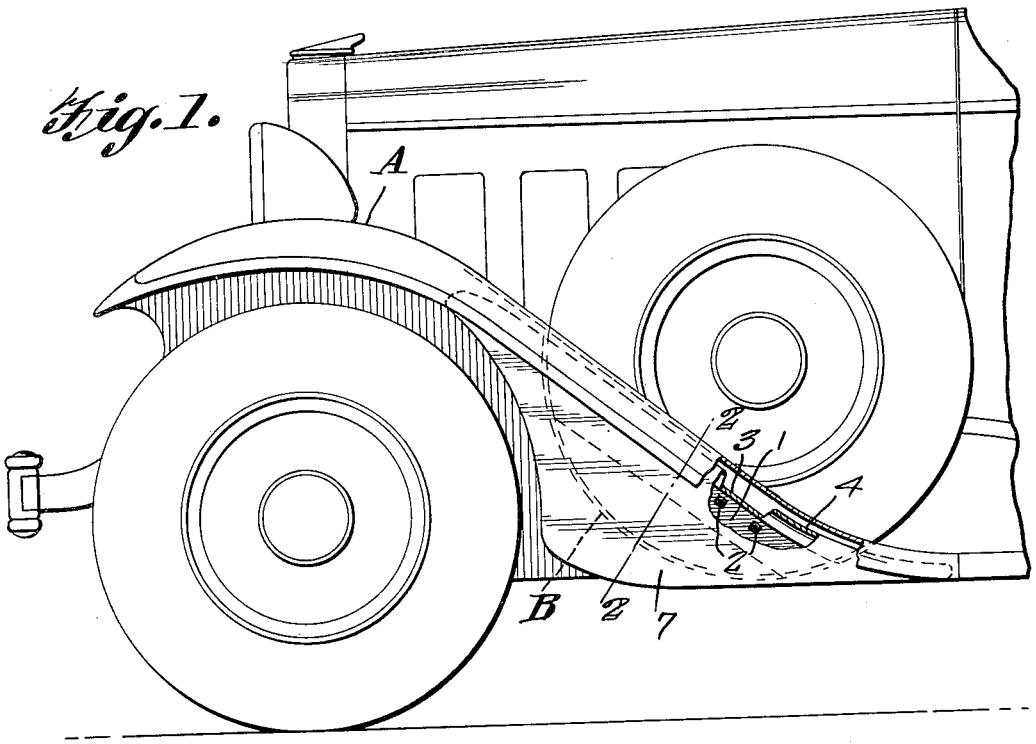
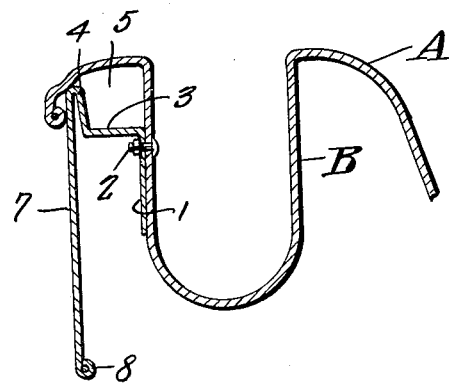
Ralph Schofield, INVENTOR
BY Victor J. Evans & Co.
ATTORNEY
WITNESS:

Patented May 1, 1934

1,957,361

UNITED STATES PATENT OFFICE 1,957,361

DUST AND MUD GUARD

Ralph Schofield, Billings, Mont.

Application October 28, 1932, Serial No. 640,111

3 Claims. (Cl. 280—152)

This invention relates to dust and mud guards for motor vehicles and its general object is to provide a device primarily designed for use with well fenders, to shield the outer side of the wheel pocket formed by the well, so as to prevent dirt, dust, mud and other foreign matter from being thrown on the side of the vehicle by the front wheels thereof when the vehicle is in motion, and the device also hides the pocket from view, therefore adding materially to the appearance of the vehicle, as the pocket becomes unsightly when covered with mud, dirt and the like.

A further object of the invention is to provide a guard of the character set forth, that is neat in appearance, simple in construction, easy to install, inexpensive to manufacture, and extremely efficient in operation and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a side elevation illustrating the application of my device to a motor vehicle.

Figure 2 is a sectional view taken approximately on line 2—2 of Figure 1.

Referring to the drawing in detail, the letter A indicates a well fender and B the well or pocket that is formed therein.

My device is preferably formed from sheet metal and is bent longitudinally to provide a strip 1 that has openings arranged therein for the purpose of receiving the bolts of bolt and nut connections 2 for securing the device to the outer wall of the wheel well or pocket B as clearly shown in Figure 2. Formed with the securing strip 1 and arranged at right angles with respect thereto as well as extending laterally therefrom is a body strip 3 that follows the inclination of the fender as shown in Figure 1, and is arranged in spaced relation with respect to the underside of the outer portion of the fender as shown in Figure 2. The body strip is provided with an upturned flange 4 that cooperates with the outer side of the well or pocket B to provide a channel 5 for the passage of water or the like so that it will be directed to the underside of the vehicle. The flange 4 engages the underside of the fender and formed therewith and depending therefrom is a shield 7 that has a curved forward edge merging into a lower edge that is aligned with the bottom edge of the fender, where the latter joins the running board, and the entire free edge of the shield 7 is rolled upon itself to provide a bead 8.

The forward edge of the shield is arranged in close proximity to the front wheel of the vehicle as shown in Figure 1, so as to prevent the passage of dirt, dust, mud and other foreign matter from being thrown laterally and outwardly of the fender.

In the use of a well fender, it is a well known fact that when matter picked up by the front wheel is thrown backwardly against the outer side of the well or pocket, that the matter is separated due to the rounded shape of the well or pocket and the matter which is directed outwardly from the vehicle is generally sprayed upon the side thereof and especially near the rear portion of the side, but when my device is used, this disadvantageous feature is eliminated, as the shield 7 not only accomplishes that function, but also hides the outer sides of the well or pocket from view, with the result my device adds materially to the appearance of the vehicle.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A guard for use with a well fender of a motor vehicle, comprising a shield depending from the fender and disposed to cover the outer side of the well of the fender, a body strip having connection with the shield and being shaped and disposed in spaced relation with respect to the well to cooperate therewith to provide a channel, a strip formed with and depending from the body strip and means for securing the guard to the well and passing through the last mentioned strip.

2. A guard for use with a well fender of a motor vehicle, comprising a shield depending from the fender in a manner to cover the outer side of the well of the fender, the forward portion of the shield being disposed adjacent to the front wheel of the vehicle and being curved to substantially follow the periphery thereof, the lower portion being arranged substantially in alignment with the lower end of the fender, a body strip having connection with the shield and spaced from the fender to provide a channel, and a strip depending from the body strip and adapted to be secured to the well of the fender.

3. A guard for use with a well fender of a motor vehicle, comprising a shield depending from the fender and adapted to cover the outer side of the well of the fender, the forward portion of the shield terminating adjacent the front wheel of the vehicle and being curved, the lower edge of the shield being aligned with the lower edge of the fender at its juncture with the running board of the vehicle, a body strip arranged in spaced relation with respect to the fender and well, a flange formed with the body strip and upper edge of the shield respectively and cooperating with the body strip and well to provide a channel, and a strip formed with and depending from the inner side of the body strip and being adapted to be secured to the outer side wall of the well for securing the guard to the fender.

RALPH SCHOFIELD.